Inventors
SIDNEY JOHN CHAPMAN
ROLAND CHARLES PENNY
BY
Tweedale & Gerhardt
Attorneys Jan. 20, 1970  S. J. CHAPMAN ET AL  3,490,215
CUTTER BAR ASSEMBLY
Filed Dec. 14, 1966  4 Sheets-Sheet 2

Inventors
SIDNEY JOHN CHAPMAN
ROLAND CHARLES PENNY
BY Tweedale & Gerhardt
Attorneys Inventors
SIDNEY JOHN CHAPMAN
ROLAND CHARLES PENNY
BY Tweedale & Gerhardt
Attorneys Jan. 20, 1970   S. J. CHAPMAN ET AL   3,490,215
CUTTER BAR ASSEMBLY
Filed Dec. 14, 1966                                    4 Sheets-Sheet 4
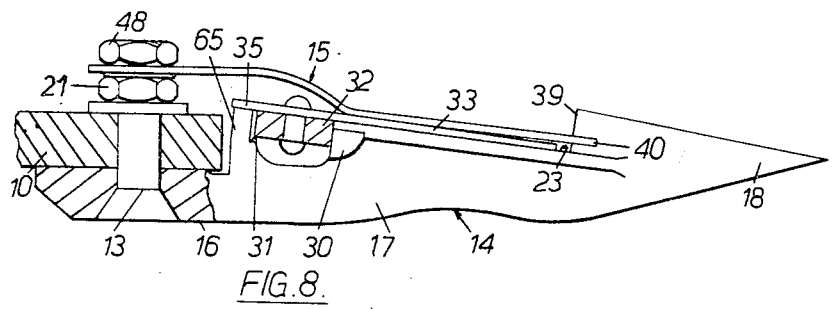
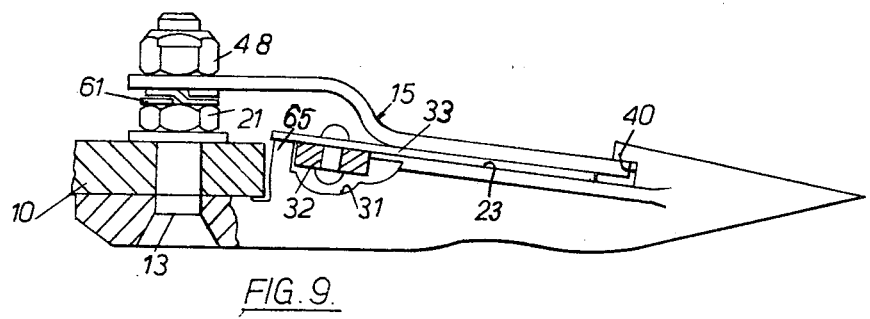
Inventors
SIDNEY JOHN CHAPMAN
ROLAND CHARLES PENNY
BY Tweedale & Gerhardt
Attorneys 3,490,215
Patented Jan. 20, 1970

3,490,215
CUTTER BAR ASSEMBLY
Sidney John Chapman and Roland Charles Penny,
Coventry, England, assignors to Massey-Ferguson
Services N.V., Curacao, Netherlands Antilles
Filed Dec. 14, 1966, Ser. No. 601,753
Claim priority, application Great Britain, Dec. 23, 1965,
54,752/65
Int. Cl. A01d 55/02
U.S. Cl. 56—298                    5 Claims

ABSTRACT OF THE DISCLOSURE

A cutter bar assembly including a plurality of mower fingers having a central depression each providing at least one cutting edge directly on the finger.

BACKGROUND OF THE INVENTION

Field of the invention

This invention relates to cutter bar assemblies for mowers and particularly to mower fingers which have a central depression therein, thus providing at least one cutting edge directly on the finger and eliminating the need for ledger plate means. Resilient knife retaining means are provided on the fingers to hold the knives against the cutting edges on the mower fingers.

Description of the prior art

Agricultural mowing machines have been proposed having a cutter bar assembly extending transversely to the direction of travel of the machine and provided with a series of fingers and a reciprocating knife which co-operates with stationary cutting edges on the fingers. One of the disadvantages of such cutter bars is the difficulty in adjusting them, and maintaining the adjustment for correct cutting.

SUMMARY OF THE INVENTION

It is an object of the present invention to provide an arrangement which reduces the adjustments required and which will cut for longer periods with little attention.

According to the invention there is provided a mower cutter bar finger having a rear section adapted to be attached to a mower cutter bar, an intermediate section having an upper face with a central depression therein and providing at least one cutting edge, and a front section having a rearwardly facing wall defining the front limit of and extending upwardly from the upper face of the intermediate section.

Preferably said rearwardly-facing wall is provided with a generally horizontal recess adjacent to or slightly spaced from the upper surface of said intermediate section.

The invention is also a mower cutter bar assembly including a cutter bar supporting a series of fingers according to the invention, a reciprocable knife having a series of cutter blades, and a series of knife retaining clips each being in the form of a flat spring located at its front end in recesses in said rearwardly facing wall and attached at its rear end to the cutter bar.

Preferably each clip is of generally U shape in plan view and the legs of the U locate in grooves in adjacent fingers.

The clips may be located at spaced intervals along the cutter bar, but it is preferred that each clip, or one leg thereof extends over each finger.

BRIEF DESCRIPTION OF THE DRAWING

In order that the invention may be more clearly understood embodiments thereof will now be described, by way of example only, with reference to the accompanying drawings in which:

FIGS. 8 and 9 are views similar to FIG. 2 showing further modifications.

DESCRIPTION OF THE PREFERRED EMBODIMENTS

Figure 1:
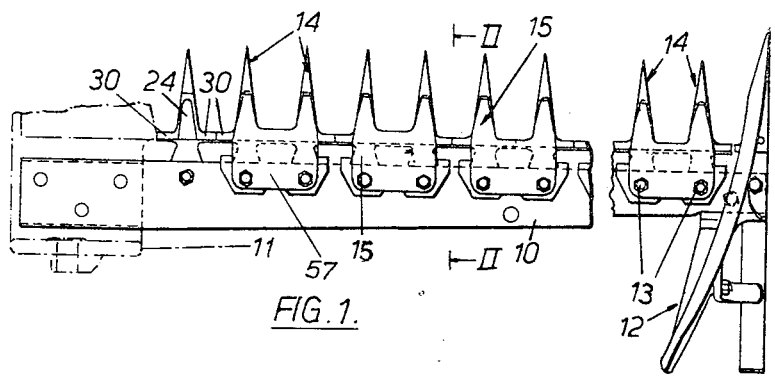
FIG. 1 is a plan view of a mower cutter bar assembly and attached fingers according to the invention.

Referring to the drawings, FIG. 1 shows a mower cutter bar assembly including a cutter bar 10, having mounted at its opposite ends inner and outer ground engaging shoe assemblies 11 and 12 respectively. The cutter bar is provided with a series of holes for the reception of bolts 13 which clamp a series of fingers 14 and knife-retaining clips 15 to the cutter bar. Between the fingers 14 and clips 15 a reciprocable knife (not shown in FIG. 1) is located.

Figure 2:
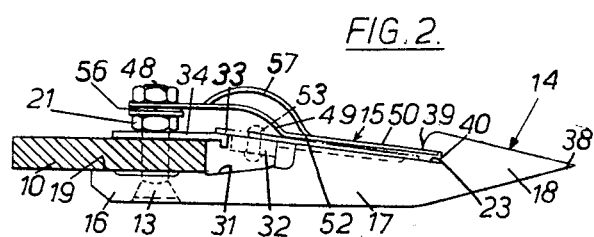
FIG. 2 is an enlarged section on the line II—II of FIG. 1.

As shown in FIG. 2 each finger 14 comprises rear, intermediate and front sections 16, 17 and 18 respectively. The rear section is provided with a plane upper surface 19, which rests against the lower face of the cutter bar 10. A bolt 13 is passed from below through holes in the finger and through the holes in the cutter bar and is provided with a nut 21 to clamp the finger onto the cutter bar.

Figure 3:
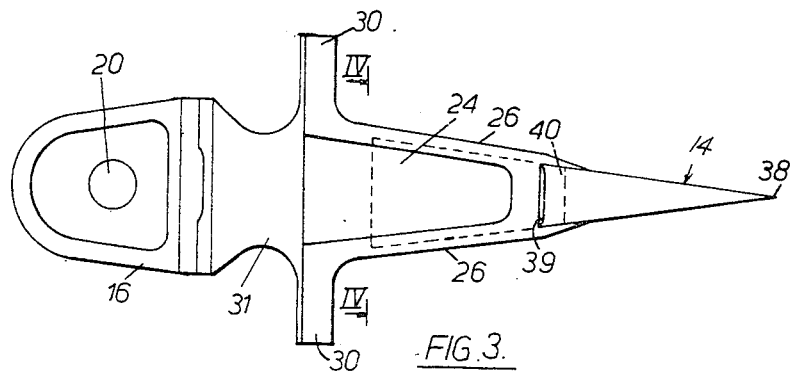
FIG. 3 is an enlarged plan view of the finger shown in FIG. 2.
Figure 4:
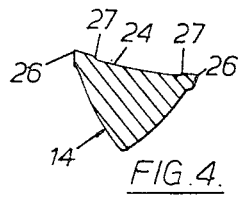
FIG. 4 is a section on the line IV—IV of FIG. 3.

The intermediate section 17 of the finger extends to a higher level than the rear section and has an upper face 23 which slopes downwardly and forwardly. The upper face 23 is provided with a central depression 24 (FIGS. 1, 3 and 4) and the side edges of the section 17 provides stationary shear edges 26 directly on the finger against which the knife operates to cut material. This construction makes the use of ledger plates unnecessary.

The edges 27 defining the limit of the depression 24 are sharp and the knife will also cut against these to prevent build up of material in the depression. Instead of being formed with the depression having the sharp edges 27 as shown, the upper surfaces 23 may be made concave.

The intermediate section 17 is also provided with spacers or wings 30 which extend transversely to abut against similar wings on the next finger along the cutter bar. In this way the wings 30 assist in keeping the fingers in their correct position.

The intermediate section 17 is also provided with a transversely extending groove 31 in which the conventional knife back 32 carrying the usual generally triangular shaped knives 33 is received and guided for reciprocating movement.

The knife back 32 is supported on a wear plate 34 held in position on the cutter bar by the bolt 13.

The front section 18 of the finger 15 extends forwardly beyond the front limit of the knives 33 and tapers to a point 38 so that during forward travel it engages the crop and divides, and if necessary lifts, the crop to present it correctly to the cutting assembly. At the rear, the section 18 is provided with a rearwardly facing wall 39 which extends generally vertically upwardly from the front end of the face 23 and is provided with a generally horizontal recess or slot 40.

Figure 5:
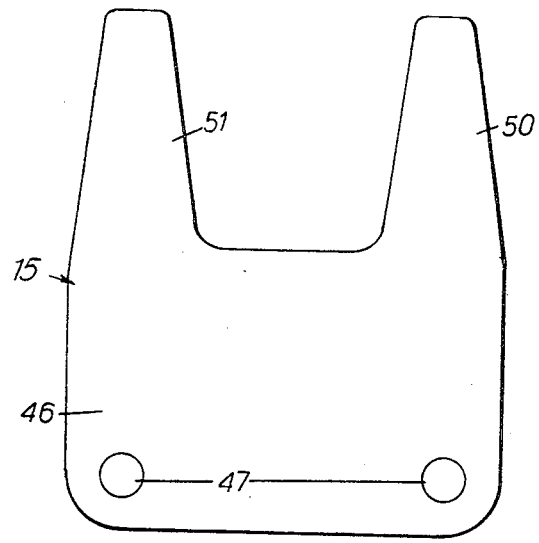
FIG. 5 is an enlarged plan view of a knife clip.
Figure 7:
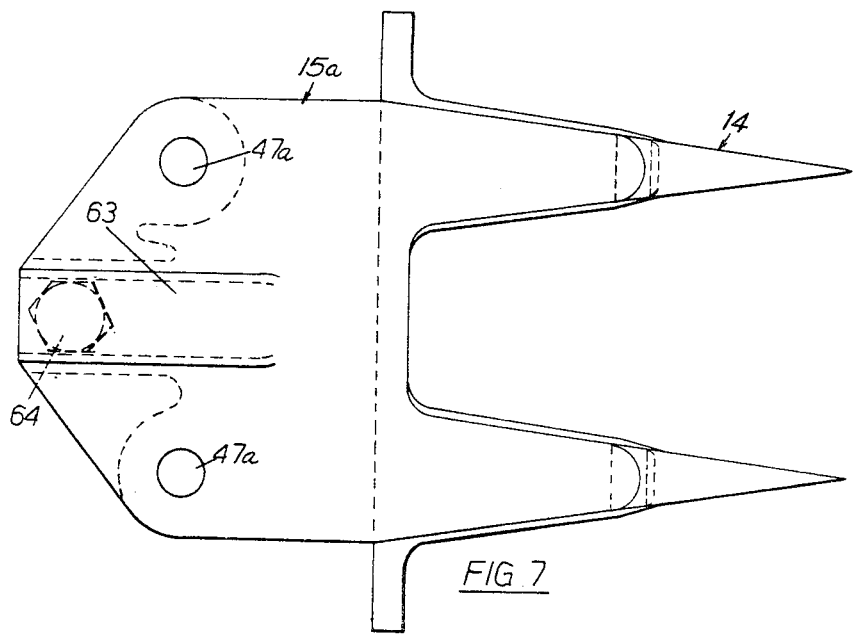
FIG. 7 is a plan view of the modified knife clip shown in FIG. 6 and including a diagrammatic representation of the finger.

With the finger 14 described above it is preferred to use the knife retaining clip 15 shown in FIGS. 1, 2 and 5. This is of generally U shape as viewed in plan, and is made of resilient material, such as spring steel. The base 46, of the U is provided with two holes 47 through which the bolts 13 holding adjacent fingers are passed to clamp the clip at the cutter bar 10 by means of nuts 48. The clip then extends forwardly, to clear the rivets 53 passing through the knife back 32 and knives 33, and is then cranked downwardly, as at 49, so that the legs 50, 51 of the clip extend generally parallel to, and bear on, adjacent knives 33. The clips are retained at their forward ends by the legs entering the recesses 40 in the walls 39.

As seen in FIG. 2 each leg 50, 51 diverges slightly from the knife at the front end of the latter so that, since the clips are of resilient material, they will bear on the knife at a relatively rearward point 52 and hold it in the correct position for the cutting action between the knife and the edges 26. The spring pressure acting on the knife may be adjusted by placing shims 56 between the nuts 21 and the clip 15.

In addition to the clip 15 shown in FIG. 2 there is visible a modified clip 57 which gives a greater clearance between the rivets 53 and the clip. This clip is used or the sections of the cutter bar adjacent to the driving mechanism.

It is preferred that the clips 15 be provided throughout the length of the cutter bar so that a leg 50 or 51 extends over each finger. This then ensures that all of the knife sections are correctly held in position to give even wear. Furthermore, the clips act to protect the upper surface of the knife. A further advantage of this type of clip is that it is sufficiently close to the knife to cooperate with it in forming upper auxiliary cutting edges to assist in removing material which would otherwise clog the cutter bar.

In the embodiment shown in FIG. 2 the only adjustment which is possible or necessary is the use of the shims 56 to initially set the knife clips correctly, and since the clips are resilient, considerable wear on the working parts is allowable before any further adjustment becomes necessary.

Figure 6:
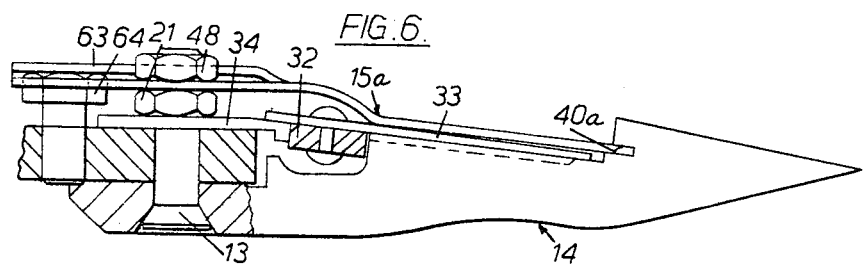
FIG. 6 is a view similar to FIG. 2 showing modifications.

FIG. 6 illustrates an alternative embodiment of the invention. The height of the slot 40a is reduced so that it is equal to the thickness of the retaining clip 15a. In addition, a modified knife clip is used. This is generally similar to that shown in FIG. 5 but in addition the rear end of the clip is extended beyond the locating holes 47a. A cenrtal longitudinal section 63 is cut out from the clip and its under surface rests on a set screw 64 screwed into the cutter bar 10. Adjustment of the set screw will then act to stress this central section 63 to adjust the pressure applied by the clip to the knife section 33.

In the embodiments of FIGS. 8 and 9 the wear plate 34 as shown in FIG. 2 is omitted and a raised portion 65 to the rear of the groove 31 forms instead a continuation of the upper face 23 to support the projecting rear edges 35 of the knives. FIG. 9 also shows the use of a spring washer 61 instead of the shims 56.

An advantage of the above embodiments without ledger plates is that by providing the depression directly in the surface 23, or making it concave, even with wear in use, the cutting edges 26 will remain relatively sharp and the knife 33 will make proper contact with them.

In a modification one resilient retaining clip could be provided for each finger instead of one clip serving two adjacent fingers.

We claim:
1. Cutter bar assembly including a cutter bar, a plurality of mower fingers supported by said cutter rbar, each mower finger comprising a rear section attached to said cutter bar, an intermediate section having an upper face with a central depression therein, said depression providing at least one cutting edge directly on the finger, and a front section having a rearwardly facing wall extending upwardly from the upper face of the intermediate section; a slot in said rearwardly facing wall of the front section; a reciprocable knife with a plurality of cutter blades; and a series of knife retaining clips, for biasing each cutter blade toward the cutting edge directly on each mower finger, each being formed from a resilient material with a front portion inserted into said slot and attached at its rear end to said cutter bar.

2. A cutter bar assembly as claimed in claim 1 wherein each clip is of generally U shape and the legs of the U-shaped clip are located in the slots of adjacent fingers.

3. A cutter bar assembly as claimed in claim 1 wherein each clip diverges slightly from the surface of the knife at the front end thereof and bears on the rearward part of the knife.

4. A cutter bar assembly as claimed in claim 1 further comprising means for adjusting the pressure which the clips exert on the knife.

5. A cutter bar assembly as claimed in claim 1 further comprising a wear plate held in position on the cutter bar to support the rear of the reciprocable knife.

References Cited

UNITED STATES PATENTS

| 13,433 | 8/1855 | Morrison | 56—305 |
|---|---|---|---|
| 16,393 | 1/1857 | Morrison | 56—305 |
| 21,499 | 9/1858 | Howell | 56—298 |
| 572,402 | 12/1896 | Barclay | 56—305 |
| 715,020 | 12/1902 | Chanal | 56—305 |
| 960,874 | 6/1910 | Flora | 56—305 |
| 1,879,195 | 9/1932 | Gray | 56—298 |
| 2,024,309 | 12/1935 | Smith | 56—305 |
| 2,246,943 | 6/1941 | Jones | 56—298 |
| 3,052,078 | 9/1962 | Padgett | 56—305 |
| 3,224,179 | 12/1965 | Schuman | 56—310 |

FOREIGN PATENTS

| 407,006 | 3/1934 | Great Britain. |
|---|---|---|

RUSSELL R. KINSEY, Primary Examiner